Aug. 15, 1961     A. K. HAMMELL     2,996,651
SERVO POSITIONING SYSTEM MONITOR
Filed Oct. 17, 1957
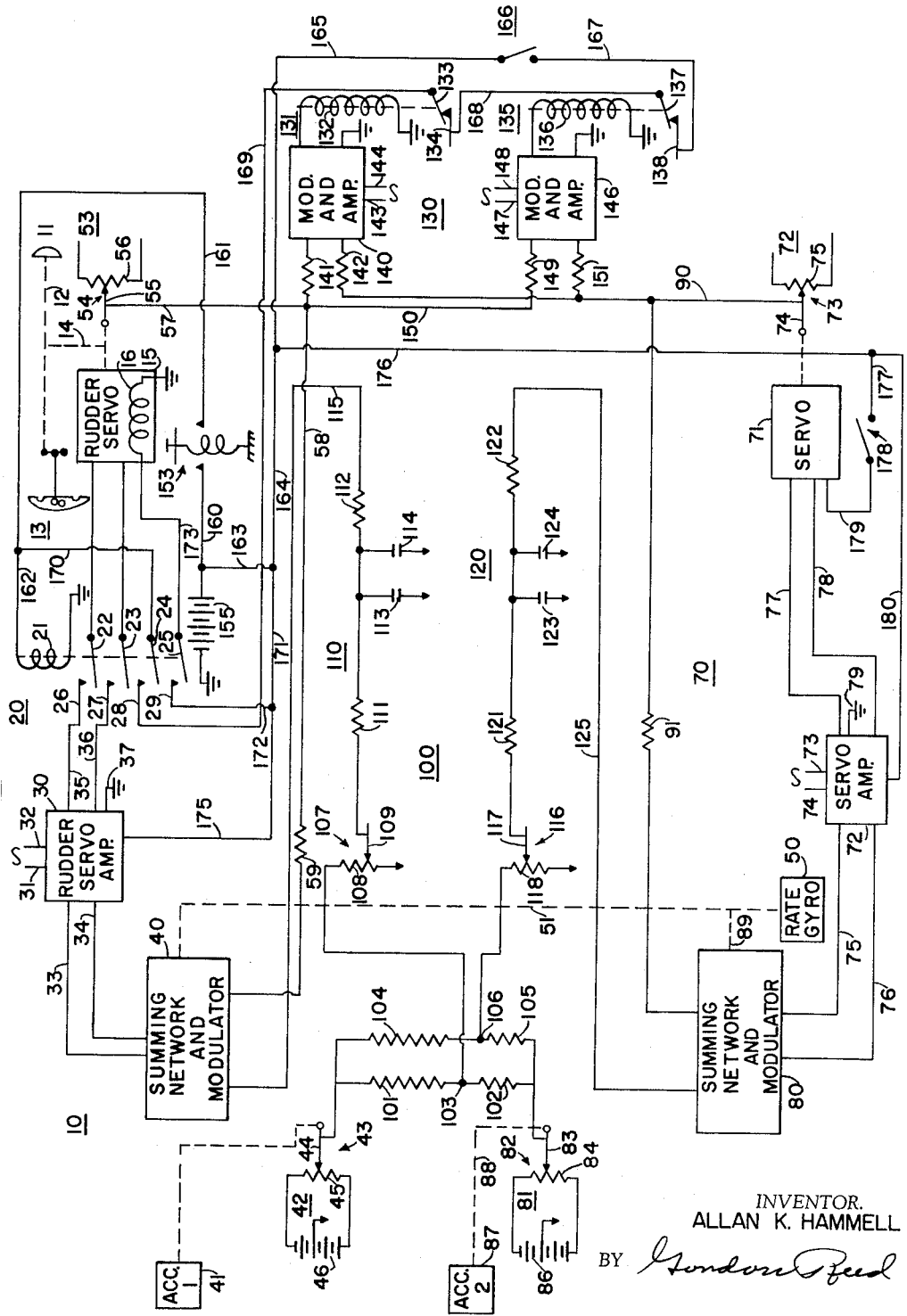
INVENTOR.
ALLAN K. HAMMELL
BY *Gordon Reed*
ATTORNEY

United States Patent Office 2,996,651
Patented Aug. 15, 1961

2,996,651
SERVO POSITIONING SYSTEM MONITOR
Allan K. Hammell, Minneapolis, Minn., assignor to Minneapolis-Honeywell Regulator Company, Minneapolis, Minn., a corporation of Delaware
Filed Oct. 17, 1957, Ser. No. 690,759
11 Claims. (Cl. 318—489)

The present invention relates to apparatus that monitors the operation of servo positioning systems such as condition control apparatus. The monitor apparatus specifically has been adapted for detecting the improper operation of a condition control apparatus such as an automatic pilot system for an aircraft.

In control systems as complicated, for example, as an automatic pilot for an aircraft, faulty operation in such system may occur. Such faulty operation may induce a dangerous aircraft attitude. Such dangerous attitude especially may result if the faulty operation causes a control surface servomotor to run away or operate to a hard-over displacement of a control surface of the craft.

The present invention includes a novel and simple arrangement including a redundant channel which is entirely independent of the channel of an automatic pilot system and this redundant channel is adapted for monitoring the operation of the channel of the automatic pilot. By such monitoring, faulty operation of the autopilot channel is detected whenever it occurs and generally independent of what the source of the faulty operation may be.

An object of the present invention therefore is to provide a novel arrangement for monitoring the operation of an automatic pilot for an aircraft.

A further object of the invention is to provide a novel apparatus for monitoring the operation of an automatic pilot for an aircraft in which apparatus the operation of one channel of the automatic pilot is compared with the operation of a redundant or simulated channel but wherein the autopilot channel and the redundant channel are controlled individually by a separate responsive means both means being responsive to the same condition.

A still further object of the invention is to provide a novel apparatus for monitoring the operation of an automatic pilot for an aircraft so that for improper functioning of the automatic pilot, the monitoring apparatus is effective to prevent further control of said aircraft by said automatic pilot.

A further object of the invention is to provide monitoring apparatus for the operation of a channel of an aircraft automatic pilot in which the operation of the redundant channel is compared with the operation of the autopilot channel wherein both channels have a separate sensor both responsive to the same condition and wherein means are provided to compensate for mismatching or misalignment in the primary sensing direction of said two sensors.

A further object of this invention is to provide in a monitoring arrangement for an automatic condition control apparatus responsive to a first control device in said apparatus and to a second control device separate from said condition control apparatus and wherein both control devices are responsive to the same condition, a compensation for mismatching or misalignment of said two devices tending to cause unlike response of said devices.

A further object of this invention is to provide in a monitoring arrangement for an automatic pilot for an aircraft which automatic pilot is responsive to the operation of a first control device in said autopilot and responsive also to a second redundant control device separate from said first control device in the automatic pilot and wherein both devices are responsive to the same condition the monitoring arrangement having a compensation network for reducing the error due to mismatching or misalignment of said two devices resulting in unlike responses of said two devices to said same condition.

A further object of this invention is to provide a special electrical circuit that may be used to eliminate errors in a monitoring apparatus due to mismatching or misalignment of two sensors both responsive to the same condition sense.

The above and other objects of the invention will more fully hereinafter appear from a consideration of the following detailed description when taken together with the accompanying drawing wherein one embodiment of the invention is disclosed.

The single figure comprising the drawing is a schematic illustration of one embodiment of the novel monitoring apparatus for the automatic pilot of an aircraft.

Aircraft automatic pilots currently in use comprise generally three channels for operating respectively the aileron, rudder and elevator control surfaces of the craft for controlling craft attitude about its roll, yaw and pitch axes. Rudder, aileron, and elevator operating servomotors in displacing their related control surfaces additionally operate signal voltage generators to provide follow-up signals which are mixed with flight condition control signals in their related channels. Such flight condition control signals are sensed by flight condition responsive devices.

The present invention has been applied to the rudder channel of such automatic pilots although it is applicable to other channels.

The operation of a channel of an automatic pilot may be monitored to ascertain malfunctioning thereof by comparing the operation of the automatic pilot channel with the operation of a redundant channel. If the operations were dissimilar, a malfunction would exist and the autopilot could be automatically disengaged or an indication of such malfunctioning could be given to permit the pilot of the aircraft to disconnect the automatic pilot from the aircraft and operate the aircraft control surfaces manually.

In such a monitoring arrangement, the redundant channel could be a substantial duplication of the autopilot channel and a similar set of sensing devices for sensing flight conditions would be provided in the redundant channel as are provided for the autopilot channel.

However, the providing of the additional set of flight conditions sensors for the redundant channel for monitor purposes results either in matching problems or in alignment problems with respect to the sensors. For example it is difficult to structurally duplicate two sensing devices so that they are in all respects the same and would provide the same control signal for the same condition being sensed. Also, taking a lateral acceleration sensing device as an example, it is difficult to arrange in the aircraft two accelerometers one in the autopilot channel and the other in the redundant channel so that their response is the same for the same lateral acceleration even though their structural properties are quite similar. If one accelerometer due to misalignment of its installation relative to the lateral axis of the aircraft responds to the normal acceleration of the craft as well as to the lateral accelerations of the craft, it will not provide a true indication of the lateral acceleration of the craft. Further, if the response of one accelerometer to normal accelerations on the aircraft is greater than that of the other accelerometer and if we assume that the aircraft in steady state flight of one G acceleration, a steady state differential signal is applied by one accelerometer relative to the other even though the craft may not have any lateral accelerations.

To consider a specific aircraft and the duplication of sensors and assuming actual values, we may arbitrarily state that under 4G flight the autopilot system should be disengaged from its control surface when the positional error between the autopilot channel servomotor displacement and the redundant channel servomotor displacement is greater than the displacement corresponding to one degree (1°) of control surface displacement. Using a typical gain of one radian of rudder control surface displacement per G lateral acceleration or accelerometer signal, from simple proportion the maximum allowable error signal ($\Delta ny$) between the two accelerometers is $$\Delta ny = \frac{\delta r_{max.}}{\delta r_{ny}} = \frac{\text{differential rudder}}{\text{rudder gain/unit lateral acc.}}$$

$$= \frac{1°}{57.3°/G} = .0174G \text{ for 4G flight or}$$

$$\Delta ny = \frac{.0174}{4} G = .00435G \text{ for level flight}$$

Briefly if the maximum error due to an alignment error between the two accelerometers is .0174G in 4G flight, the maximum error between the two signals in level flight or during 1G flight is .00435G. This error is equivalent to an alignment error between the two accelerometers of one fourth degree (¼°). Since for small angles the angle is equal to the sine of the angle.

While the alignment problem may be avoided by utilizing a single accelerometer for operating two signal generators one for the autopilot channel and one for the redundant channel, an increase in threshold operation of the accelerometer will result. The sensitivity problem of an increase in threshold requiring a higher acceleration before the accelerometer would operate would appear. Furthermore, the problem of structural mismatching of the two signal generators would still remain. Additionally since the monitoring arrangement is to provide a safety device for an aircraft it is also desirable to utilize duplicate sensing devices and to avoid utilizing but one sensor.

A solution which permits the duplication of sensing elements and yet which reduces the matching and alignment problems of the sensors is provided in the applicant's novel arrangement.

Referring to the drawing, the applicant's invention has been applied to the rudder channel 10 of an automatic pilot although as stated either the roll control channel operating the ailerons or the pitch control channel controlling the elevator surface could be utilized. In the rudder channel, a rudder surface 11 has its operating means 12 connected to a conventional manually operable rudder bar linkage 13 for conventional manual operation. The operating means 12 is connected through a motor driven member or output 14 of a rudder servomotor 15. The rudder servo 15 is operatively connected through a rudder channel engage relay 20 to a rudder servo control amplifier 30. The amplifier 30 is of the electronic type and is controlled by a combined modulator or voltage converter and electric signal summing network arrangement 40.

The summing network in arrangement 40 may receive electrical signal voltages from a signal generator 42 operated by a lateral accelerometer 41 and network rebalancing signals from a servomotor operated signal generator 53. Additionally the summing network may contain a signal generator operated by various flight condition sensing devices such as a rate gyroscope 50 which senses yaw rates of the aircraft.

The rudder channel 10 may be referred to as a yaw damper system and a second channel 70 referred to as a yaw damper system monitor also contains a servomotor 71 reversibly controlled from a servo amplifier 72 which receives control signals from a signal summing network and modulator arrangement 80. The summing network and modulator 80 may receive control signals from a signal generator 81 operated by a lateral accelerometer 87 and rebalance signals from a signal generator 72 operated by the redundant servomotor 71. Additionally this summing network and modulator arrangement 80 may include a signal generator operated by the rate gyroscope 60.

A comparison may be made between the displacements of the rudder servomotor 15 and the redundant or monitoring servomotor 71 to determine if any malfunction is present in the yaw damper 10. Such comparison may be made by an arrangement 130 which serves to disconnect or operatively disengage the rudder servomotor 15 from the rudder surface 11 upon a predetermined difference in the displacement of the two servomotors.

It would seem that accelerometer 41 would solely be used in the yaw damper system 10 and accelerometer 87 would be used in the redundant or monitor system 70. The addition of the second yaw damper or monitor system causes matching problems in the signals from the two accelerometers and this matching problem involves not only the matching structurally of the accelerometers themselves but also their alignment or installation in the aircraft so that they respond similarly within limits only to the signal to be sensed.

While the alignment problem may be avoided by utilizing a single accelerometer for operating two signal generators such as was utilized with the rate gyro 50, the safety provisions in the monitoring arrangement are increased by duplicating the sensing devices rather than utilizing but one sensing device for both yaw damper and damper monitor systems.

To reduce the signal matching and alignment problem associated with the two accelerometers an arrangement 100 has been provided. The arrangement 100 averages the sum of the two accelerometer signals and with precision summing will substantially eliminate the matching problem.

Structural details of the components forming the yaw damper system and the monitoring apparatus and their respective associations will now be considered. In the drawing, the rudder surface 10 of a dirigible craft such as an aircraft has its operating means 12 operatively connected to the output member 14 of the servomotor 15. The servomotor 15 may be a relay controlled direct voltage energized motor. The motor may comprise a pair of brake windings and alternatively energized clutch windings as shown in FIGURE 3 of the patent to Hamby Number 2,466,702. The motor in the present disclosure may preferably be of the type disclosed in the patent to C. E. Vogel 2,770,428. The motor comprises a magnetic clutch having an operating winding 16 for operatively connecting the motor 15 with the output member 14. The motor includes a pair of alternatively energized field windings, a pulsing clutch-brake winding, and an armature wherein each field winding is in series with the pulsing clutch winding and armature whereby the armature and pulsing clutch are energized whenever either field winding is energized.

The rudder engage relay 20 may be of the four pole single throw type having an operating winding 21 which through its armature causes relay arms 22, 23, 24, and 25 to engage relay in contacts 26, 27, 28, and 29 respectively. The rudder servo 15 is connected through the relay 20 in its energized condition to the rudder servo amplifier 30. This amplifier may be similar to that disclosed in the patent to Hamby and is of the alternating voltage discriminator type having alternating voltage power input connections 31, 32 connected to an alternating voltage supply, alternating signal voltage input connections 33 and 34 extending from the summing network and modulator 40; a direct voltage power input connection 175, direct voltage power output connections 35 and 36 connected to relay contacts 26 and 27; and ground connection 37.

The summing network and modulator 40 includes provisions for combining electrical signals. In the present arrangement, reversible polarity direct voltage electrical signals are arranged in a parallel summing arrangement to provide a resultant direct voltage signal which is supplied to a modulator which converts the direct signal voltage into an alternating signal voltage. The modulator may be a conventional vibrator having its energizing winding connected to the same alternating voltage supply as are amplifier conductors 31 and 32.

Signal generator 42 provides a signal voltage proportional to the lateral acceleration of the aircraft or its acceleration in the direction of the pitch axis of the craft. Signal generator 42 comprises a potentiometer 43 having a slider 44 and resistor 45. The resistor 45 is connected across a direct voltage supply which may be a battery 46. The battery 46 has a center tap connected to signal ground as indicated. Slider 44 is operated in either direction from the electrical center of resistor 45 having the potential of the signal ground. The slider 44 is operated by accelerometer 41 which is of the linear type and adapted to respond to craft lateral accelerations.

Servomotor operated rebalance signal generator 53 comprises a potentiometer 54 having a slider 55 and resistor 56 which is connected across a direct voltage supply source similar to battery 46. The slider 55 is displaced in either direction from the electrical center of resistor 56 having a potential of that of signal ground by the output member 14 of the servomotor 15. The output of signal generator 53 is supplied through conductor 57, conductor 58, summing resistor 59 to the arrangement 40.

In the redundant channel, signal generator 81 comprises a potentiometer 82 having an adjustable slider 83 and resistor 84. Resistor 84 is connected across a direct voltage supply such as battery 86 having its midpoint connected to signal ground. Slider 83 may be displaced in either direction from the electrical center of resistor 84, having a potential of signal ground, by an accelerometer 87 through operating means 88. Accelerometer 87 is responsive to craft lateral accelerations.

The slider 83 representing the output of signal generator 81 is connected to one end of resistors 102 and 105. Slider 44 which is the output member of signal generator 42 is connected to one end of resistors 101 and 104. Resistor 101 is connected in series with resistor 102 and resistor 104 is connected in series with resistor 105. Terminal 103 between resistors 101 and 102 is connected to a voltage dividing potentiometer 107 comprising resistor 108 and adjustable tap 109. Slider 109 is connected to one end of a resistor 111 in a lag network 110 comprising resistor 111 and capacitors 113 and 114. Capacitors 113 and 114 in parallel extend to signal ground from the opposite end of resistor 111. The junction of resistors 111 and capacitors 113 and 114 is connected through a series or summing resistor 112 and conductor 115 to arrangement 40.

In network 100, junction 106 of resistors 104 and 105 is connected to a voltage dividing potentiometer 116 having an adjustable tap 117 and resistor 118. The tap 117 is connected to a lag network 120 comprising a resistor 121, and capacitors 123 and 124. Resistor 121 is connected at one end to slider 117 and has its opposite end connected to signal ground through parallel capacitors 123 and 124. The junction of resistor 121 and capacitors 123 and 124 is connected through a summing resistor 122 and conductor 125 to arrangement 80.

In the arrangement, resistors 101, 102, 104 and 105 may be all equal. However, if desired, they may be made unequal with resistor 101 equal to two thirds the resistance of resistor 102 and resistor 105 equal to two thirds the resistance of resistor 104.

Having described the signal section of both the yaw damper and the yaw damper monitor, consideration will now be given to the relay section 130 that having other components along with engage relay 20 control the operative engagement of the rudder servo 15 with the rudder surface 11. Relay section 130 includes a relay which is of the single pole single throw type having an operating winding 132 which through its armature operates arm 133 to disengage a relay out contact 134, and a relay 135 which is of the single pole single throw type having an operating winding 136 which through its armature operates relay arm 137 to disengage relay out contact 138.

Relay winding 132 is connetced to a modulator and amplifier arrangement 140 having power conductors 143 and 144 connected to the alternating voltage source. This arrangement includes both a modulator for converting direct signal voltages to alternating voltages and an alternating voltage amplifier. The voltage from servomotor operated potentiometer 53 and the voltage from redundant servomotor operated signal generator 72 are electrically summed and applied to arrangement 140 and if the signals are equal and opposite the relay winding 132 is not energized. However if the signals do not mutually cancel each other the voltage amplifier will have an output applied to the relay 132 which operates to disengage relay arm 133 from out contact 134.

The rudder monitor system also includes a second modulator and amplifier arrangement 146 corresponding to arrangement 140. The arrangement 146 includes alternating voltage input conductors 147 and 148 connected to the alternating voltage source and has the output of the amplifier applied to the operating winding 136 of relay 135. Control voltages for the arrangement 146 are derived from rudder servomotor operated signal generator 53 through conductor 57, conductor 150 and summing resistor 149 and also from redundant servomotor operated signal generator 72, conductor 90, summing resistor 151. In the arrangement 146 the voltages from generator 53 and 72 are algebraically electrically combined and if they algebraically are equal the relay winding 136 will not be energized. If the voltages are not mutually concealable, the relay winding 136 will be energized to disconnect relay arm 137 from relay out contact 138.

The relay control section additionally includes a source of direct voltage such as battery 155, a normally open momentarily closed manually operable engage switch 153, a manually operable single pole single throw disengage switch 166 which is normally closed, and a manually operable single pole single throw servo engage switch 178.

Prior to engaging the rudder servo 15 with the rudder surface 11, we may assume that the network controlling rudder servo amplifier 30 is placed in a balanced condition and likewise the network controlling the redundant servo amplifier 72 is in the balanced condition and that the rudder servo 15 and the servo 71 have the same relative displacements with their signal generators 53, 72 developing equal signals which are mutually concealable. To engage the servo 15 and surface 11, the engage switch 153 is closed completing an autopilot-airplane engaged circuit from battery 155, conductor 160, switch 153, conductor 161, engage relay winding 21, to ground and return to battery ground. With the operation of the relay arms of relay 20, an engage relay holding circuit is established from battery 155, conductor 163, conductor 164, conductor 165, closed disengaged switch 166, conductor 167, relay contact 138, relay arm 137, conductor 168, relay out contact 134, relay arm 133, conductor 169, rudder engage relay in contact 28, relay arm 24, conductor 170, conductor 162, engage relay winding 21, to ground and return to battery ground.

The operation of the rudder engage relay 20 completes a servomotor-rudder engage circuit from battery 155, conductor 163, conductor 171, conductor 172, relay contact 29, relay arm 25, conductor 173, winding 16 of the magnetic clutch, to ground and return to battery ground. The energization of winding 16 engages drive and driven members of a magnetic clutch to operatively connect the rudder servo 15 with the rudder surface 11.

With the rudder servo and rudder surface operatively connected, the aircraft is stabilized about the yaw axis by the rate gyro 50. Upon the development of a yaw rate, the rate gyro 50 in response thereto operates a signal generator in summing network and modulator arrangement 40 to apply a control signal on amplifier 30. The amplifier 30 through its relays connects direct voltage conductor 175 with either conductor 35 or 36 depending upon the phase of the signal applied to the amplifier and thereby energizes one or the other of the field windings of rudder servo 15 to operate the rudder 11. The motor 15 simultaneously adjusts servomotor displacement signal generator 53 to develop a rebalance signal which rebalances the summing network. Since the rudder servo amplifier 30 alternatively energizes one or the other of its relays depending upon the phase of a control signal the direct voltage from battery 155, conductor 163, conductor 175, applied to the servo amplifier 30 is transmitted through one or the other of the operated relays to the rudder servo 15.

In the redundant or monitor system, the switch 178 will have been closed with the operation of the engage switch 153. Signals resulting from the yawing movement of the craft are applied through the rate gyro 50 to the summing network and modulator arrangement 80 which unbalances the input section of servo amplifier 72 and effects operation of the redundant servo 71 which positions slider 74 of signal generator 72. A feedback voltage from the signal generator 72 is applied through summing resistor 71 to rebalance the network and modulator arrangement 80.

Upon the presence of a lateral acceleration of the aircraft, the accelerometers 1 and 2 will operate their respective sliders 44 and 83 to develop signals in signal generators 42 and 81. The signals from the generators 42 and 81 are applied to the network arrangement 100. If resistor 101 has two thirds the resistance of resistor 102 and resistor 105 has two thirds the resistance of resistor 104 the voltage on conductor 115 is equal to $.6A+.4B$ wherer A and B are the voltages of signal generators 42 and 81 respectively. Also the voltage on conductor 125 is equal to $.6B+.4A$. The resulting difference of the voltages on conductors 115 and 125 are $.2A-.2B=.2(A-B)$. Thus the difference in the displacement of servomotor 15 and redundant servomotor 71 is $.2(A-B)$. By the arrangement of network 100, instead of obtaining the difference between the voltages of signal generators 42 and 81 and the comparison of the positions of the two servomotors, the arrangement is made less sensitive in that the control voltage is merely $.2(A-B)$ and not $(A-B)$.

The difference $.2(A-B)$ of the control signals applied to the control of rudder servo 15 and redundant servo 71 are reflected in the dissimilarity of voltages of signal generators 53 and 72. These signal voltages are applied to both modulator and amplifier arrangements 140, 146. If the magnitudes of the voltages A and B are large and there is a sufficiently large difference of the two voltages, the modulator and amplifier arrangements 140 and 146 will energize their respective relay windings disconnecting relay arm 133 from contact 134 and contact 137 from contact 138 to thus open the servo-rudder engage relay holding circuit for the relay operating winding 21 and the rudder engage relay 20 falls to its out position as shown in the figure. This opens the circuit for the magnetic clutch winding 16 to operatively disengage magnetic clutch members and the rudder servomotor 15 from the rudder surface 11.

It will be noted that the outputs of both signal generators 53 and 72 are applied to two separate modulators 140 and 146 and this merely duplicates the corresponding elements to provide the desired safety features of a redundant monitor system.

We have noted that the differential control voltage $.2(A-B)$ determines the energization of relays 131 and 135. If the accelerometers 1 and 2 have merely a slight difference in installation misalignment or structural mismatching, the signals in generators 42, 81 will have only slight differences and furthermore as modified by network 100 the control voltage $.2(A-B)$ will have insufficient magnitude to overcome the threshold of relays 131 and 135 so that the relays will not be operated. On the other hand, when the voltages A and B are large and they have a fairly large difference in value because of a malfunction then the control voltage $.2(A-B)$ is of sufficient magnitude to overcome the threshold of relays 131 and 135 and disengagement of the servo 15 is effected. In other words, if in the monitoring system of the servo and redundant servo displacements, a one inch difference of displacement of the two servos is required before disengagement, by taking .2 of the quantity $(A-B)$ we increase the permissible misalignment of the two accelerometers relative to each other but still disengage for large differences in signal as in a malfunction. Thus if a malfunction occurs in the rudder damper or in the monitor systems which results in a large difference in displacements of motors 15 and 71, the rudder engage circuit is interrupted and the servo 15 is operatively disconnected from its surface 11.

In the network 100, resistors 101, 102, 104 and 105 may be equal and the fact that the two systems, that is the redundant system and rudder damper system are tied together at terminals 103 and 106 makes it possible for a single failure to cause undesired motion in both the rudder damper system and the monitor system which would not cause automatic disengagement of the rudder servo 15 from the surface 11. In other words the control voltage on relay section 130 would equal zero since the voltage from A is applied equally to the rudder damper system 10 and to the monitor system 70 and likewise the voltage from B is also equally applied to the rudder damper system 10 and to the rudder damper monitor system 70. It is thus apparent that if the accelerometer 1 failed to respond to a lateral acceleration but accelerometer 2 did respond, the accelerometer 2 would control both the rudder damper and the damper monitor equally and no disengagement of the rudder servo 15 would result despite a malfunction of accelerometer 1.

However, there are several features which make this equality of the four resistances acceptable. With the resistances 101, 102, 104 and 105 equal a single generator such as generator 42 or 81 would have fifty percent authority of its normal control but this fifty percent authority would be applied to both the rudder damper and the rudder damper monitor. With fifty percent authority by each of the signal generators 42 and 81 and with a seven second time constant on the lag networks 110 and 120 the rate of excursion of the rudder 11 due to a hard over failure is quite slow.

By the expression "hard over failure" is meant that one or the other of the accelerometer sliders 44 or 83 had been adjusted to an extreme position on its respective resistor and had been maintained there either by some frictional force or other factor. In such situation, the "hard over" signal would indicate a lateral acceleration which might not actually be present. The consequent effect of such hard over failure signal on the rudder servomotor is to displace the rudder which would result in an actual lateral acceleration being set up. This lateral acceleration would be sensed by the operative accelerometer which would provide a signal opposing the signal from the hard over accelerometer. Since the signal from the hard over accelerometer is of a permanent magnitude, it is balanced by a signal from both the functioning accelerometer and from the rudder servo feedback potentiometer, consequently a steady state side slip acceleration will result from the displaced rudder resulting from such hard over.

The gains of the systems may be set up so that the lateral acceleration due to a hard over or fail signal will result in a steady state lateral acceleration of 0.1G or less. Thus any failure which would not cause disengagement will never command more than 0.1G lateral acceleration which is substantially safe at all flight conditions. The system reaction to a failure of this type is slow enough to permit the human pilot ample time to disengage the autopilot by opening autopilot disengage switch 166. This functioning of the network 100 and the monitor system applies whether resistances 101, 102, 104 and 105 are equal or whether they are unequal as stated above.

Normally, due to mismatching in signals from signal generators 42 and 81, a difference in displacement of servomotor 15 relative to redundant servomotor 71 will cause a disengagement of the rudder servomotor 15, from the rudder surface 11. A failure of the type which results from a "hard over" as described which would not cause disengagement of the rudder servomotor will never command more than 0.1G lateral acceleration.

While a resistor-capacitor delay or lag circuit 110 or 120 has been illustrated, any appropriate method of delaying the transmission of a signal at terminal 103 or 106 to the arrangements 40 or 80 may be utilized. Furthermore, while direct voltage control signals and parallel direct voltage summing has been utilized, alternating voltage signals and either parallel alternating voltage summing or series alternating voltage summing may be utilized in the arrangement.

It will now be realized by those skilled in the art that a novel monitoring arrangement for a control apparatus has been provided that includes a special circuit or network (responding to sensors in the control apparatus and sensors in a redundant apparatus) that serves to eliminate mismatching or alignment errors of the sensors thereby to prevent nuisance disengagements of a control apparatus such as an autopilot from an aircraft for slight mismatching or misalignment of two sensing devices but which provides for such disengagement upon malfunctioning of either the redundant or autopilot system of dangerous type of failures but would continue to operate at reduced gain for non-critical failures.

While but one embodiment of the invention has been illustrated and described in detail, the invention is not limited to the precise embodiment disclosed but as defined by the appended claims.

What is claimed is:

1. Monitoring apparatus for an automatic pilot operating attitude control means of an aircraft comprising: means in said automatic pilot responsive to side slip or lateral acceleration of the aircraft for providing a first signal; second means separate from said automatic pilot also responsive to side slip or lateral acceleration of the aircraft for providing a second signal; further means deriving two control signals each having components of said first and second signals; means for comparing the magnitudes of said two control signals and effective when the control signals have a predetermined difference for rendering said automatic pilot ineffective on said attitude control means.

2. The apparatus of claim 1, said further means deriving the two control signals and responsive to both first and second signals is arranged so that the components of the first signal in the two control signals are different.

3. Monitoring apparatus for an automatic pilot operating attitude means of an aircraft comprising: means in said automatic pilot responsive to a flight condition of the aircraft for providing a first signal voltage; second means separate from said automatic pilot also responsive to said flight condition of the aircraft for providing a second signal voltage; further means deriving two control signal voltages each having components of said first and second signals comprising a pair of voltage dividers each having the first and second signal voltages applied at opposite ends with intermediate points of each voltage divider supplying a control signal voltage; and means effective when the two control signal voltages have a predetermined difference for rendering said automatic pilot ineffective on said attitude control means.

4. A safety device for an automatic pilot controlling an aircraft, comprising: monitoring means responsive to operation of a channel of said automatic pilot and to operation of a redundant channel, each channel jointly responsive to two separate operable sensors sensing the same flight condition of said craft and each channel in response to both sensors developing a control signal in accordance with the operation of both sensors; and means in said monitoring means comparing the relative magnitudes of said control signals and responsive to a certain relation in magnitude of said signals for rendering the automatic pilot ineffective to control said craft.

5. A safety device for an automatic pilot operating attitude control means of an aircraft, said safety device including: a first means supplying a first control signal denoting the operation of a servomotor in a channel of the automatic pilot; a second means providing a second control signal denoting the operation of a servomotor in a redundant channel, further means controlling each channel and in turn controlled by two separate sensors and both sensors being responsive to the same flight condition; comparing means responsive to said first and second control signals and operating on predetermined relation of said control signals to render said automatic pilot ineffective on said attitude control means, said further means including means for correcting for mismatching of said two sensors to prevent undesired operation of said comparing means including a gain reducing device responsive to both sensors and applying to one channel a different control effect from that applied to the other channel.

6. In a safety device for an automatic pilot operating attitude control means for an aircraft: first means providing a control signal and controlled by a flight condition sensor; second means providing a second control signal controlled by a second sensor, both sensors being responsive to the same flight condition of said aircraft; comparing means responsive to both control signals and operating on predetermined relation of said signals; means responsive to operation of said comparing means; and means in said comparing means for correcting for mismatching or misalignment of said two sensors to prevent undesired operation of said comparing means including a gain reducing device comprising a pair of voltage dividers, means for energizing the opposed end of each voltage divider from said two control signals, and means for obtaining a comparison means operating voltage from two intermediate points of said two voltage dividers.

7. In an automatic condition control apparatus: control means responsive to change in said condition and controlling said automatic condition control apparatus to restore the condition; further means providing a signal varying with the sense of operation of said control means; separate redundant means providing a signal in accordance with the change in said condition; means for comparing the signals from said further means and said separate means; a separate condition sensor for said condition, control means and said separate means both sensors being responsive to the same condition; and means responsive to both sensors and controlling said control means and redundant means for compensating for mismatching or misalignment of said two sensors.

8. In a control system having condition control means including a first condition responsive device, monitoring means for said control means comprising: a second device responsive to the same conditions, first means providing a control signal in accordance with the operation of said first and second condition responsive devices; separate means including the first and second devices responsive to said same condition and providing a second control signal in accordance with the sense of the operation of the first and second devices; and means for comparing said two control signals and effective on predetermined relation thereof to prevent control of said condition by said control system; said comparing means comprising two separate additional signal providing devices each controlled by said two control signals, said two signal providing devices operating said comparing means on predetermined relation of said signals from said two additional devices.

9. In control apparatus for a dirigible craft capable of movement from a predetermined position and having an automatic pilot effective to detect a function of such movement and to operate in a sense to restore the craft to the original position to thereby eliminate such function, monitoring apparatus for said automatic pilot comprising: first means responsive to a function of the movement of the craft for providing a first signal; second means also responsive simultaneously to said function of the movement of the aircraft for providing a second signal; further means for combining said signals; comparing means connected to the further means and operative when the first and second signals have a predetermined difference; and means in said further means for compensating for defects in the signals due to structural misalignment of the two responsive means to prevent undesired operation of said comparing means for small differences of said signals causing cross effects affecting the magnitude of either signal so that its signal is not due solely to said function.

10. In a monitoring apparatus for an automatic pilot for an aircraft that combines the signal voltages of two separate flight condition responsive devices both responsive to the same condition, means for providing two further control signals each control signal having components of response to both condition responsive devices, each control signal being provided by a separate voltage divider each voltage divider having its opposed ends energized by the two signal voltages and an intermediate point of said voltage divider providing a control signal.

11. Monitoring apparatus for an automatic pilot for an aircraft; said aircraft having a control surface, said apparatus comprising: two similar sensors responsive to the same flight condition of the aircraft; first means in said automatic pilot responsive to both sensors for positioning the control surface to correct said condition; second means responsive to both sensors, but having a response to one sensor different in magnitude from the response of the first means to said one sensor; and further means comparing the response of the first and second means and effective on large differences in the response of said two sensors rendering said automatic pilot ineffective to position said surface.

References Cited in the file of this patent

UNITED STATES PATENTS

| | | |
|---|---|---|
| 2,674,711 | MacCallum | Apr. 16, 1954 |
| 2,823,877 | Hess | Feb. 18, 1958 |

OTHER REFERENCES

Magazine article: Aviation Week, vol. 57, issue 25, December 22, 1952, pp. 35–38.